US007955690B2

(12) United States Patent
Pickering et al.

(10) Patent No.: US 7,955,690 B2

(45) Date of Patent: Jun. 7, 2011

(54) SLEEVED FUSER MEMBER

(75) Inventors: Jerry A. Pickering, Hilton, NY (US); Suzanne P. Clark, Rochester, NY (US); Susan C. Baruch, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1550 days.

(21) Appl. No.: 10/636,470

(22) Filed: Aug. 7, 2003

(65) Prior Publication Data

US 2004/0028432 A1 Feb. 12, 2004

Related U.S. Application Data

(60) Provisional application No. 60/402,377, filed on Aug. 9, 2002.

(51) Int. Cl.
*B32B 7/02* (2006.01)

(52) U.S. Cl. ........ 428/212; 428/220; 428/447; 399/320; 399/333; 399/328; 399/307

(58) Field of Classification Search .................. 428/447, 428/212, 220; 430/124; 399/320, 333, 328, 399/307
See application file for complete search history.

(56) References Cited

U.S. PATENT DOCUMENTS

| | | | | |
|---|---|---|---|---|
| 2,612,484 | A | 9/1952 | Bankoff | 260/29.6 |
| 3,607,494 | A * | 9/1971 | Rowland | 156/86 |
| 4,011,362 | A | 3/1977 | Stewart | 428/447 |
| 4,029,827 | A | 6/1977 | Imperial et al. | 427/22 |
| 4,046,795 | A | 9/1977 | Martin | 260/448.2 E |
| 4,101,686 | A | 7/1978 | Strella et al. | 427/22 |
| 4,185,140 | A | 1/1980 | Strella et al. | 428/418 |
| 4,257,699 | A | 3/1981 | Lentz | 355/3 FU |
| 4,272,179 | A | 6/1981 | Seanor | 355/3 FU |
| 4,372,246 | A | 2/1983 | Azar et al. | 118/60 |
| 4,905,050 | A | 2/1990 | Derimiggio et al. | 355/290 |
| 4,984,027 | A | 1/1991 | Derimiggio et al. | 355/290 |
| 5,017,432 | A | 5/1991 | Eddy et al. | 428/422 |
| 5,247,336 | A | 9/1993 | Mills, III | 355/285 |
| 5,292,606 | A | 3/1994 | Fitzgerald | 428/35.8 |
| 5,336,539 | A | 8/1994 | Fitzgerald | 428/36.8 |
| 5,406,362 | A | 4/1995 | Mills | 355/285 |
| 5,464,698 | A | 11/1995 | Chen et al. | 428/421 |
| 5,480,724 | A | 1/1996 | Fitzgerald et al. | 428/447 |
| 5,595,823 | A | 1/1997 | Chen et al. | 428/421 |
| 5,716,714 | A | 2/1998 | Chen et al. | 428/473.5 |
| 5,851,673 | A | 12/1998 | Chen et al. | 428/421 |
| 5,906,881 | A | 5/1999 | Chen et al. | 428/141 |
| 6,041,210 | A | 3/2000 | Chen et al. | 399/333 |
| 6,190,771 | B1 | 2/2001 | Chen et al. | 428/375 |
| 6,224,978 | B1 | 5/2001 | Chen et al. | 428/376 |
| 6,312,817 | B1 * | 11/2001 | Chen et al. | 428/447 |
| 6,393,249 | B1 | 5/2002 | Aslam et al. | 399/333 |
| 6,419,615 | B1 | 7/2002 | Chen et al. | 492/56 |
| 6,602,368 | B2 * | 8/2003 | Geiger | 156/86 |

* cited by examiner

*Primary Examiner* — Jennifer C McNeil
*Assistant Examiner* — Lawrence D Ferguson
(74) *Attorney, Agent, or Firm* — Carl F. Ruoff; Andrew J. Anderson

(57) ABSTRACT

A fuser member is described wherein the fuser member includes a core, a cushion comprising a first layer adjacent to the core and a second layer on top of the first layer, and a plastic sleeve. Also described is a process for producing a fuser member, which includes applying a first layer of cushioning composition on a core, applying a second layer of cushioning composition on the first layer of the cushioning composition, and applying a plastic sleeve on the second layer of the cushioning composition.

33 Claims, No Drawings

SLEEVED FUSER MEMBER

This application claims the benefit under 35 U.S.C. §119(e) of prior U.S. Provisional Patent Application No. 60/402,377 filed Aug. 9, 2002, which is incorporated in its entirety by reference herein.

BACKGROUND OF THE INVENTION

The present invention relates to a fuser roller. More particularly, this invention relates to a polyperfluoroalkoxy (PFA) sleeved fuser roller for producing good fusing and high image quality in electrophotographic imaging and recording processes.

In imaging methods, such as electrostatographic imaging, and recording processes, such as electrophotographic copying, an electrostatic latent image formed on a photoconductive surface is developed with a thermoplastic toner powder. The thermoplastic toner powder is then fused to a receiver to create an image. The fusing member can be a roll, belt, or any surface having a suitable shape for fixing the thermoplastic toner powder to the receiver. The fusing step commonly consists of passing the receiver, for example, a sheet of paper, on which toner powder is distributed in the form of an image, through the nip of a pair of rolls. At least one of the rolls is heated. In the case where the fuser member is a heated roll, a smooth resilient surface is bonded either directly or indirectly to the core of the roll.

A toner fuser roll includes a cylindrical core, often metallic, that typically has a heating source in its interior. A resilient base cushioning layer, which may contain filler particles to improve mechanical strength and/or thermal conductivity, is formed on the surface of the core, which may advantageously be coated with a primer to improve adhesion of the resilient layer. Roller cushioning layers are commonly made of silicone rubbers or silicone polymers such as, for example, poly(dimethylsiloxane) polymers (PDMS) of low surface energy, which minimize adherence of toner to the roller. Frequently, release oils composed of, for example, poly(dimethylsiloxanes) are also applied to the fuser roll surface to prevent the toner from adhering to the roll. Such release oils may interact with the PDMS in the resilient layer upon repeated use, which in time causes swelling, softening, and degradation of the roll.

In previous technologies, such as U.S. Pat. No. 6,224,978 (incorporated herein by reference), a fuser roller includes three concentric layers each containing particulate fillers. These three layers include a base cushioning layer containing a condensation-cured PDMS, a barrier layer covering the base cushioning and containing a cured fluorocarbon polymer, and an outer surface layer containing an addition-cured PDMS. The particulate fillers in each layer include one or more of aluminum oxide, iron oxide, calcium oxide, magnesium oxide, tin oxide, and zinc oxide. The barrier layer, which may be a Viton™ elastomer (sold by DuPont) or a Fluorel™ elastomer (sold by Minnesota Mining and Manufacturing), is a relatively low modulus material typically having a Young's modulus less than about 10 MPa. Therefore, it has a negligible effect upon the mechanical characteristics of the roller, including the overdrive. Although the barrier layer prevents swelling of the roller, the silicone surface is subject to excessive wear and abrasion.

Fluoroelastomer surface coatings for fuser rollers are also mentioned, for example, in U.S. Pat. Nos. 5,595,823 and 5,851,673, (both incorporated herein by reference). Fluoroelastomers have improved wear resistance compared to silicones but are generally not as chemically resistant. The fluoroelastomer is subject to staining by toner components leading to degradation of the material and toner offset.

Fluoroplastic sleeves offer the advantage of excellent wear resistance as well as excellent chemical resistance. Unfortunately, plastic sleeves are generally of very high hardness and actually perform poorly in some applications due to poor conformability with the receiver surface. Poor conformability to the receiver surface also produces poor image quality. Having a soft cushion provides better fusing properties; however, it also stretches the sleeve and causes wrinkles in the sleeve. Moreover, thin or soft sleeves are also preferred for improved fusing properties, but these are also more prone to wrinkling. A thicker sleeve may avoid wrinkling, but it also reduces fusing quality as well as image quality. Elastomeric coatings such as fluoroelastomer coatings do not suffer wrinkling as readily from stretching as they have much greater extensability than plastic coatings including sleeves.

Accordingly, there is a need to provide a sleeved fuser member that avoids wrinkling but does not suffer reduced fusing quality. More specifically, it would be desirable to provide a cushioned fuser member with a thin plastic sleeve that does not suffer from wrinkling. In particular it would be desirable to provide a sleeved cushioned fuser roller in an externally heated fuser system that has good fusing performance and does not suffer from wrinkling.

SUMMARY OF THE PRESENT INVENTION

A feature of the present invention is to provide sleeved fuser members that do not wrinkle or delaminate.

Another feature of the present invention is to provide sleeved rollers that have good fusing properties, particularly when used in an externally heated fuser system.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these objectives and other advantages, and in accordance with the purposes of the present invention as embodied and broadly described herein, the present invention relates to a sleeved fuser roller. This sleeved fuser roller includes a core, a cushion having a first cushioning layer adjacent to the core and a second cushioning layer on top of the first cushioning layer, and a plastic sleeve.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to a sleeved fuser member. In more detail, the present invention, in part, relates to a sleeved fuser member having a core, a first cushioning layer, a second cushioning layer, and a sleeve. Preferably, the first cushioning layer is adjacent to the core, the second layer is on top of the first cushioning layer, and the sleeve is on top of the second cushioning layer. More preferably, the sleeve is a plastic sleeve, such as a fluoroplastic sleeve.

Additionally, the present invention relates to a fuser member having a core, a cushion layer with a thickness of from about 50 mils to about 600 mils, and a plastic sleeve with a thickness of from about 10 to 200 microns. Preferably, the fuser member has a overall shore A hardness of about 40 or greater.

Furthermore, the present invention relates to a toner fusing system. In more detail, the present invention, in part, relates to a toner fusing system having a fuser member for contacting and heating a toner on a substrate to fuse the toner to the substrate. Preferably, the fuser member includes a core, a plastic sleeve having a thickness of from about 10 to about 200 microns, at least one cushion layer interposed between the core and the plastic sleeve, and an external heat source to heat the fuser member.

The fuser member can be any shape, such as a roller, plate, or belt, but is preferably cylindrical. The description below refers to a fuser roller for purposes of the preferred embodiment. However, the same description applies to other fuser members as well. The core may be made of any material sufficient to be a core, like various metals, such as iron, aluminum, nickel, stainless steel, and the like, or other resilient materials such as various synthetic resins and the like. The core can be hollow and a heating element can be generally positioned inside the hollow core to supply the heat for the fusing operation. The fuser member is preferably used in an externally heated fuser, where more than 50% of the heat energy is received from outside of the roller. Heating elements suitable for this purpose are known to those skilled in the art, and may be a quartz heater made of a quartz envelope having a tungsten resistant heating element disposed internally thereof. In a preferred embodiment, the fuser member receives 100% of the heat energy from outside the fuser member. The method of providing the necessary heat in the fuser roller is not critical to the present invention and the fuser member can be heated by internal means, external means, or a combination of both. All heating means are well-known to those skilled in the art for providing sufficient heat to fuse the toner to the support. The fuser member of the present invention can be adapted in the fusing system described in U.S. Pat. Nos. 4,372,246; 4,905,050; 4,984,027; and 5,247,336, all incorporated herein by reference.

The cushion layer(s) is formed on the surface of the core, and preferably includes at least a first cushioning layer and a second cushioning layer. One or more of these layers, may contain filler particles to improve mechanical strength and/or thermal conductivity. Preferably, the cushion layer is made of polymers that have good heat resistance to remain stable at fusing temperatures. The cushion layer can be made from known materials used for fuser member layers, such as silicone rubbers, fluorosilicone rubbers, or any of the same materials that can be used to form fluoroelastomer layers. Siloxanes include curable condensation and addition cure silicones. Peroxide-curable siloxanes can also be used with conventional initiators.

Curable and preferably heat-curable siloxanes include the hydroxy-functionalized polyorganosiloxanes belonging to the classes of silicones commonly known as "hard" and "soft" silicones. Preferred hard and soft silicones are silanol-terminated polyfunctional polyorganosiloxanes.

Exemplary hard and soft silicones are commercially available or can be prepared by conventional methods. The hard functionalized siloxane is preferably a polyfunctional poly($C_{1-6}$alkyl)phenyl siloxane or polyfunctional poly($C_{1-6}$alkyl) siloxane. Examples of commercially available silicones include DC6-2230 silicone and DC-806A silicone (sold by Dow Corning Corp.), which are hard-silicone polymers, and SFR-100 silicone (sold by General Electric Co.) and EC-4952 silicone (sold by Emerson Cummings Co.), which are soft-silicone polymers.

Preferably, the cushion layer is made of addition cured vinyl and hydrosilane functional polyorganosiloxane and, more preferably, the polyorganosiloxane is polydimethylsiloxane. Preferred addition cured silicone rubber layers are polymethyl siloxanes, such as SILASTIC J or E, sold by Dow Corning. Preferred fluorosilicone rubbers include polymethyltrifluoropropylsiloxanes, such as SYLON Fluorosilicone FX11293 and FX11299 sold by 3M. Addition curable silicones are preferred.

The optional filler materials can be added to provide added strength and abrasion resistance to any surface layer. Omission of the inert filler does not reduce the adhesive strength of the fluoroelastomer layer. The optional fillers in the cushion layer may include inorganic particulate materials, for example, metals, metal oxides, metal hydroxides, metal salts, and mixtures thereof. For example, U.S. Pat. No. 5,292,606, the disclosure of which is incorporated herein by reference, describes fuser roller base cushion layers that contain fillers comprising particulate zinc oxide and zinc oxide-aluminum oxide mixtures. Similarly, U.S. Pat. No. 5,336,539, the disclosure of which is incorporated herein by reference, describes a fuser roller cushion layer containing dispersed nickel oxide particles. Also, the fuser roller described in U.S. Pat. No. 5,480,724, the disclosure of which is incorporated herein by reference, includes a base cushioning layer containing dispersed tin oxide particles.

Moreover, the cushioning composition may include curable fluoroelastomers such as a fluoroelastomer foam. Fluoroelastomer foam as a fuser cushion is described in U.S. Pat. No. 4,372,246, incorporated by reference. Curing material includes curing agents, crosslinking agents, curing accelerators, foaming agents, and fillers or mixtures of the above. Suitable curing agents for use in the present invention include the nucleophilic addition curing agents as disclosed, for example, in U.S. Pat. No. 4,272,179, incorporated herein by reference. Exemplary of a nucleophilic addition cure system is one containing a bisphenol crosslinking agent and an organophosphonium salt as an accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred. Suitable curing accelerators for the bisphenol curing method include organophosphonium salts, e.g., halides such as benzyl triphenylphosphonium chloride, as set forth in U.S. Pat. No. 4,272,179.

The cushion layer can have any conventional thickness. Preferably, the cushion layer has a thickness of from about 20 mils or less to about 1000 mils or more and, more preferably, from about 100 mils to about 600 mils. For internally heated fusing systems, the cushion is preferably below about 120 mils. Where external heating is the primary heat source, the cushion thickness may be greater than 1000 mils, such as about 1300 mils.

As stated earlier, the cushion layer preferably includes a first cushioning layer, which can be adjacent to and in contact with the core and a second cushioning layer, which can be on top of and in contact with the first cushioning layer. The first cushioning layer can have a thickness of greater than about 10 mils, preferably from about 25 mils to about 900 mils and, more preferably, from about 50 mils to about 600 mils. The second cushioning layer can have any thickness, such as a thickness of at least about three times the thickness of the sleeve to no more than about equal to the thickness of the first cushioning layer. Preferably, the thickness of the second cushioning layer is greater than about 10 mils. More preferably, the thickness of the second cushioning layer is from about 15 mils to about 200 mils and, most preferably, from about 20 mils to about 60 mils.

Preferably, the combination of the first and the second cushioning layers are soft enough to provide a high quality fusing, but hard enough not to cause the sleeve to stretch and wrinkle. The hardness of each cushioning layer is preferably different, such as a difference of about 5 shore A or more (e.g., a difference of 10, 15, 20, or more). In one embodiment, a cushioned roller has a first and a second cushion layer wherein the second cushion layer is a higher durometer than the first cushion layer. In a second embodiment, a cushioned roller has a first and second cushion layer wherein the second layer is a lower durometer than the first cushion layer. In both embodiments the performance of the roller is improved by the cushion comprising two cushion layers.

In the first embodiment of the invention, to provide such a cushioning layer it is preferable that the second cushioning layer, which is on top of the first layer, has a shore A hardness greater than the shore A hardness of the first cushioning layer. For example, the first cushioning layer can have a shore A hardness of from about 20 to about 70 and the second cushioning layer can have a shore A hardness of from about 40 to about 90. Preferably, the shore A hardness of the first cushioning layer is from about 30 to about 65 and the shore A hardness of the second layer is from about 50 to about 85. More preferably the shore A hardness of the first cushioning layer is from about 35 to about 60 and the shore A hardness of the second layer is from about 60 to about 80. The first and second cushion layers preferably have a hardness difference of about 5 shore A or greater, more preferably about 10 Shore A or greater.

In this first embodiment, the lower hardness (or durometer) of the first cushion layer provides the indentation of the sleeved roller surface against the backup roller to allow the roller surface to make sufficient contact with the toned media surface to transfer heat and therefore to provide improved fusing properties. In addition, the higher hardness (or durometer) of the second cushion provides a more rigid surface on which the sleeve is supported. Since the rigid surface limits the strain on the sleeve caused by the forces in the nip, wrinkling of the sleeve is minimized. Further, thin sleeves which are desirable for improved fusing properties may be employed on the thicker, softer cushions desired for use with externally heated fusing systems.

In the second embodiment of the invention, to provide such a cushioning layer it is preferable that the second cushioning layer, which is on top of the first layer, has a shore A hardness of less than or about equal to the shore A hardness of the first cushioning layer. For example, the first cushioning layer can have a shore A hardness of from about 40 to about 90 and the second cushioning layer can have a shore A hardness of from about 5 to about 70. Preferably, the shore A hardness of the first cushioning layer is from about 50 to about 85 and the shore A hardness of the second layer is from about 10 to about 65. More preferably the shore A hardness of the first cushioning layer is from about 50 to about 80 and the shore A hardness of the second layer is from about 20 to about 60. The first and second cushion layers preferably have a hardness difference of about 5 shore A or greater, more preferably about 10 Shore A or greater.

In this second embodiment, the lower hardness (or durometer) of the second cushion layer provides additional conformability to the sleeved roller surface to allow the roller surface to make better contact with the toner surface and therefore to provide improved fusing properties. In addition, the higher hardness (or durometer) of the first cushion provides lower indentation of the roller by the backup roller (or pressure roller) and therefore lower strain in the sleeve to minimize wrinkling. Excessive strain of the sleeve is particularly a problem when using external heating where a thick cushion is desired.

The hardness of the core, first cushion, second cushion, and sleeve may be measured using a shore A gauge built according to ASTM2240. The peak reading is used if the composite is damaged during the measurement. This measurement of the composite structure provides an apparent shore A hardness of the composite fuser member. For fuser member cushions that are equal or less than about 100 mils thick, the apparent shore A hardness is preferably greater than about 40. For fuser member cushions that are equal or less than about 200 mils thick, the apparent shore A hardness is preferably greater than about 43. For fuser member cushions that are equal or less than about 300 mils thick, the apparent shore A hardness is preferably greater than about 46. For fuser member cushions that are equal or less than about 400 mils thick, the apparent shore A hardness is preferably greater than about 50. For fuser member cushions that are greater than about 400 mils thick, the apparent shore A hardness is preferably greater than about 56.

The core may optionally be coated with a primer to improve adhesion of the cushion layer. The adhesion promoter layer, for instance, can be any commercially available material known to promote the adhesion between fluoroelastomers and metal, such as silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Preferred adhesion promoters are epoxy-functionalized silane coupling agents. The most preferable adhesion promoter is a dispersion of THIXON 300, THIXON 311 and triphenylamine in methyl ethyl ketone. The THIXON materials are supplied by Morton Chemical Co.

The plastic sleeve of the present invention can be made of any material that is preferably chemically inert, has a low surface energy, and is resistant to wear and tear and temperature. The sleeve can also be considered a layer. Preferably, the sleeve is made of materials such as fluoroplastics. The fluoroplastic sleeve can include a sintered fluoropolymer resin powder, such as a semicrystalline fluoropolymer or a semicrystalline fluoropolymer composite. Such fluoropolymer resin powder materials include polytetrafluoroethylene (PTFE) powder, polyperfluoroalkoxy powder, polyfluorinated ethylene-propylene (FEP) powder, poly(ethylenetetrafluoroethylene) powder, polyvinylfluoride powder, polyvinylidene fluoride powder, poly(ethylene-chlorotrifluoroethylene) powder, polychlorotrifluoroethylene powder, and mixtures and copolymers of fluoropolymer resin powders. The preferred fluoropolymer resin powders used to make the fluoropolymer resin layer are PFA and FEP. Some of these fluoropolymer resin powders are commercially available from DuPont as TEFLON™ or SILVERSTONE™ materials and from Whitford as DYKOR™ materials.

The sleeves can be formed on the cushion layer or preformed and attached to the cushion layer. Extruded plastic sleeves are often expanded and stretched to improve throughput of the process. This expansion and stretching imparts residual stress in the sleeves that makes them more prone to wrinkling. Preferably the sleeve is extruded so that the residual stresses from the production of the sleeve are minimized. This can be achieved by reducing the expansion of the sleeve from the extruded diameter, and reducing the extension of the extruded tube after extrusion.

Plastic sleeves can be generally surface treated on the inner diameter to promote adhesion of the cushion material to the sleeve. This may be accomplished by methods such as treatment with caustic elemental sodium solutions.

Other suitable plastics and/or fluoroplastic copolymers are available commercially. For example, a vinylidene fluoride-co-tetrafluoroethylene co-hexafluoropropylene can be used which can be represented as -(VF)(75)-(TFE)(10)-(HFP)(25)-. This material is marketed by Hoechst Company under the designation "THV Fluoroplastics". Additionally, vinylidene fluoride-co-tetrafluoroethylene-co-hexafluoropropylene, which can be represented as -(HVF)(49)-(TFE)(41)-(HFP)(10)- can also be used. This material is marketed by Minnesota Mining and Manufacturing, St. Paul, Minn., under the designation "3M THV". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV fluoroplastics are set apart from other melt-processable fluoroplastics by a combination of high flexibility and low process temperatures. With flexural modulus values between 83 Mpa and 207 Mpa, THV fluoroplastics are more flexible than most fluoroplastics.

Preferably, the plastic sleeve has a thickness sufficient to provide a good fusing and avoid wrinkling. Preferably, the plastic sleeve has a thickness of from about 10 microns or less to about 200 microns or more and, more preferably, from about 25 microns to about 100 microns. Additionally, the plastic sleeve has a surface roughness of less than 50 microinch and, more preferably less than 35 microinch average surface roughness. The contact surface roughness can be measured by typical techniques, such as surfanalyzer 400™ with a conical stylus under a 250 mg load.

Preferably, the sleeve has a tensile hardness of from about $3\times10^7$ or less to about $30\times10^8$ pascals or more at 175° C. and, more preferably, from about $4\times10^7$ to about $2\times10^8$ pascals at 175° C., using dynamic mechanical analysis.

In one embodiment of the present invention, the fuser member can include a core, a cushion, and a sleeve. Preferably, the cushion has a thickness of from about 50 mils to about 600 mils and the sleeve has a thickness of from about 10 to about 200 microns. Preferably, the fuser member composite of this embodiment has a shore A of about 40 or greater. Preferably, the composition of the cushion layer, the core, and the plastic sleeve of this embodiment of the present invention are the same as the composition of the cushion layer, the core and the sleeve described above.

The fusing member of the toner fusing system of the present invention can contact and heat a toner on a substrate. The contacting and the heating of the toner on the substrate by the fusing member can fuse the toner to the substrate. In this embodiment, the fuser member can include a core, a plastic sleeve having a thickness of from about 10 to about 200 microns, and at least one cushion layer interposed between the core and the plastic sleeve. Preferably, the heating source in this embodiment is an external heat source, which can heat the fuser member. Any conventionally known external heat source can be used. Preferably, the composition of the cushion layer, the core, and the sleeve of this embodiment of the present invention are the same as the composition of the cushion layer, the core and the sleeve described above.

The present invention further relates to methods of making the fuser roller of the present invention, which can be used in forming images. The method of making the fuser roller can involve applying a first cushioning layer on a core, applying a second cushioning layer on the first cushioning layer, and applying a sleeve, which is preferably chemically inert, has a low surface energy, and is resistant to wear and tear and temperature on the second cushioning layer.

The first cushioning layer may be adhered to the metal element via a cushion primer layer. Preferably, the first cushioning layer is formed on a cylindrical metal core by injection molding followed by curing. In one example, the core can be placed in a metal tube or a mold and the first cushion's composition or material, which is preferably in a form of a liquid silicon, can be injected into the mold. Preferably, the first cushion's composition is premixed with a catalyst to crosslink the first cushion's composition. Once the mold is filled with the first cushion's composition or material, the mold containing the core and the first cushion's composition can be cured. Preferably, the mold is placed under sufficient pressure and temperature for a sufficient time to solidify the first cushion's composition.

Some cured cushioning compositions have a tendency to shrink after a predetermined time. To prevent shrinking of the first cushioning layer, in one example, the cured first cushioning layer can be subjected to a post-curing process. This process can involve subjecting the cured first cushioning layer to elevated temperatures and pressures. Preferably, the temperature and pressure of the post-curing process is higher than the temperature and the pressure of the curing process and, more preferably, is higher than the temperature and the pressure at which the sleeved fuser roller is used for fixing a toner image to a receiver. Most preferably, the temperature of the post-curing process is from about 150° C. to about 260° C. for about 3 to 48 hours at atmospheric pressure. The post-curing process can provide composition with more consistent cushioning properties; thus the process can prevent the cushioning layer from shrinking.

The second cushioning layer may be adhered to the first cushioning layer by the same method used to fuse the first cushioning layer to the metal element. Preferably, the second cushioning layer is adhered to the first cushioning layer by injection-molding followed by curing. In one example, the core and the cured first cushioning layer, that may or may not be subjected to a post-curing process, can be placed in a second mold. Preferably, the second mold includes a sleeve and, more preferably, a fluoroplastic sleeve. The second cushioning composition or material, which can be premixed with a catalyst, is preferably in a form of a liquid silicon and is injected into the second mold. Once the mold is filled with the second cushioning composition or material, the mold containing the core, the cured first cushioning layer, the second cushioning composition, and preferably the sleeve can be cured. Preferably, the mold is placed under sufficient pressure and temperature and for a sufficient time to solidify the second cushioning composition. In addition, sufficient pressure is preferred to eliminate defects such as air voids between the second cushioning layer and the sleeve, or the sleeve and the mold surface. More preferably, the second cushioning composition is cured at a temperature of at least about 25° C. to about 80° C., at a pressure of from about 100 psi to about 30,000 psi for a sufficient time to allow the composite roller to be removed from the mold.

As stated earlier, some cured cushioning compositions have a tendency to shrink after a predetermined time. To prevent the shrinking of the second cushioning layer, in one example, the cured second cushioning layer can be subjected to a post-curing process. This process can involve subjecting the cured second cushioning layer to an elevated temperature and pressure. Preferably, the temperature and pressure of the post-curing process is higher than the temperature and pressure of the curing process and, more preferably, is higher than the temperature and the pressure at which the sleeved fuser roller is used for fixing a toner image to a receiver. Most preferably, the temperature of the post-curing process is from about 150° C. to about 260° C. for about 3 to 48 hours at atmospheric pressure. The optional post-curing process can provide a composition with more consistent cushioning properties; thus the process can prevent the cushioning layer from shrinking.

In one example, the optional post-curing process can be performed only after curing the second cushioning layer on top of the first cushioning layer.

In another example, the plastic sleeve is not included within the second mold. Therefore, the plastic sleeve can be applied to the second layer of the cushioning layer. In this example, the process of making the plastic sleeve can include, for instance, sintering fluoropolymer resin powders. The fluoropolymer resin powders can be dry, solventless, solid particles. The fluoropolymer resin powders can be prepared by mechanically grinding a fluoropolymer resin to form the powder. Methods for forming fluoropolymer resin powders are well known in the art. For example, PTFE powder can be prepared by polymerizing tetrafluoroethylene in an aqueous medium with an initiator and emulsifying agent. The PTFE is then separated from the aqueous medium and dried, and then mechanically ground to produce fine particulate. For an additional description on making fluoropolymer resin powders, see U.S. Pat. No. 2,612,484, and Encyclopedia of Polymer Science and Engineering, Vol. 16, 2nd Ed., pp 577-599 (John Wiley & Sons 1989), both incorporated herein by reference.

The fluoropolymer resin powder can then be applied to the fluoroelastomer layer by a dry (e.g., solventless) application method. Examples of solventless application methods include molding and electrostatic powder spray coating. The preferred method is electrostatic powder spray coating, which preferably is accomplished by dispersing the fluoropolymer resin powder in a gas stream, passing the powder through a high voltage field in order to apply an electrostatic charge to the powder, grounding the support having the fluoroelastomer layer and spraying the charged powder at the fluoroelastomer layer thereby causing the charged powder to electrostatically adhere to the fluoroelastomer layer. Preferably, the resulting fuser member having the support, fluoroelastomer layer and electrostatically-adhered fluoropolymer resin powder layer is then placed into an oven at a temperature and for a time sufficient to sinter the fluoropolymer resin powder to the fluoroelastomer layer. Typically, fluoropolymer resin powders are sintered at 270° C. to 350° C. for 10 minutes to 1 hour.

Electrostatic spray systems useful for this method are available from Nordson Corp and other suppliers. Additional information on electrostatic powder spray coating can be found in the literature, for example, see Encyclopedia of Chemical Technology, Vol. 19, pp 1-25 (John Wiley & Sons 1982), incorporated herein by reference.

In the operation of the toner fusing system of the present invention, release agent can be applied to the fuser member surface so that this agent contacts toner on the receiver, and can also contact the receiver, during the operation of the fuser member. Particularly where the fuser base is a cylindrical roller or an endless belt, the release agent is applied, while the base is rotating or the belt is running, upstream of the contact area between fuser member and receiver toner.

If employed, the release agent preferably is applied so as to form a film on the fuser surface. As a matter of particular preference, the release agent is applied so as to form a film that completely, or at least essentially, or at least substantially, covers the fuser surface. Also as a matter of preference, during operation of the system the release agent is applied continuously, or at least essentially or at least substantially continuously, to the fuser surface.

Release agents are intended to prohibit, or at least lessen, offset of toner from the receiver to the fuser surface, and if release agent is employed preferably it acts accordingly. In performing this function, the release agent can form, or participate in the formation of, a barrier or film that releases the toner. Thereby the toner is inhibited in its contacting of, or at least prevented from adhering to, the fuser surface.

The release agent can be a fluid, such as an oil or other liquid, and is preferably an oil. It can be a solid or a liquid at ambient temperature, and a fluid at operating temperatures. Also as a matter of preference, the release agent is a polymeric release agent, and as a matter of particular preference, is a silicone or polyorganosiloxane oil.

The release agent may have a viscosity greater than about 2,00 cSt at ambient temperature, preferably greater than about 300 cSt, still more preferably between about 300 and 100,000 cSt viscosity, and yet still more preferably between about 20,000 and about 100,000 cSt viscosity at ambient temperature.

Further, release agents which may be used include polymeric release agents having functional groups. Appropriate polymeric release agents with functional groups include those which may be found as liquids or solids at room temperature, but are fluid at operating temperatures.

Particular functional group polymeric release agents which may be used include those set forth in U.S. Pat. Nos. 4,011,362 and 4,046,795, incorporated herein in their entireties, by reference. Still further release agents which may be used are the mercapto functional polyorganosiloxanes described in U.S. Pat. No. 4,029,827, and the polymeric release agents having functional groups such as carboxy, hydroxy, epoxy, amino, isocyanate, thioether, and mercapto functional groups, as described in U.S. Pat. Nos. 4,101,686 and 4,185,140, and all of these patents are incorporated herein in their entireties, by reference.

Further with regard to the functional agents, one point to consider is that because of their expense usually they are diluted with nonfunctional polyorganosiloxanes, particularly nonfunctional polydimethylsiloxanes. Another point is that for obtaining good release activity with a functional release agent, monofunctionality is preferred, so that the molecule cannot react both with toner and with the fusing surface layer, and thereby serve as a toner/fuser member adhesive. Therefore, the functional agent preferably contains a substantial portion of the mono-functional molecule.

Therefore, the functional polyorganosiloxane preferably contains as great a proportion of the monofunctional moiety as is practically possible. As a matter of particular preference, the functional polyorganosiloxane has a sufficient monofunctional proportion so as not to act as the indicated adhesive.

Accordingly, a preferred release agent composition contains a blend of nonfunctional polyorganosiloxane, particularly nonfunctional polydimethylsiloxane, with amino functional polyorganosiloxane, and the amino functional polyorganosiloxane contains monoamino functional polyorgano-siloxane. Another preferred release agent composition contains a blend of nonfunctional polyorganosiloxane, particularly nonfunctional polydimethylsiloxane, with mercapto functional polyorganosiloxane, and the mercapto functional polyorganosiloxane comprises monomercapto functional polyorganosiloxane.

The release agent may be applied to the fuser member by any suitable applicator, including sump and delivery roller, jet sprayer, oiled pad, and the like, for instance, as described in U.S. Pat. Nos. 5,017,432 and 4,257,699, incorporated herein in its entirety, by reference. Preferably the present invention employs a rotating wick oiler.

A wick oiler contains a storage compartment for the release agent and a wick in contact with this compartment. During operation of the toner fusing system of the invention, the wick is situated so as to be in contact with the stored release agent and also with the fusing surface layer of the fuser member. The wick picks up release agent and transfers it to the fuser member. A rotating wick oiler further rotates in conjunction with the fuser surface and does not slide against the surface. In this manner streaks in the applied oil layer and/or abrasion of the fuser surface layer are avoided.

The release agent is applied to the receiver, particularly in the case of paper, preferably at a rate of from about 0.1 to about 20 microliters, more preferably at a rate of about 1.0 to about 8 microliters, per 8½ by 11" copy. The applicator accordingly is adjusted to apply the release agent at this rate.

The present invention will be further clarified by the following examples, which are intended to be exemplary of the present invention.

EXAMPLES

Example 1

A cylindrical aluminium fuser core was cleaned and primed. Silicone rubber was then mixed with catalyst, injection molded onto the core, and cured under pressure and at elevated temperatures sufficient to gel the silicone. The core was oven-cured at elevated temperatures to substantially complete the reaction. The thickness and durometer of the resulting silicone cushions are shown in Table 1. After removal from the mold, the core with cushioning was positioned within a mold containing a treated and primed PFA sleeve. An underlayment of silicone rubber was injection-molded between the PFA sleeve and the cushion and cured under pressure and at elevated temperatures sufficient to gel the silicone. The composite was placed in an oven and cured at elevated temperatures to substantially complete the reaction. The thickness of the PFA sleeve and the durometer of the resulting silicone underlayment are also shown in Table 1. The apparent Shore A was measured directly on the roller composite using a Shore A gauge built to specifications according to ATSM D2240. Reported values are the peak values.

TABLE 1

| Example | PFA thickness (microns) | Cushion Thickness (mils) | Cushion Durometer (shore A) | Underlayment Durometer (shore A) | Apparent Shore A |
|---|---|---|---|---|---|
| 1 | 30 | 400 | 40 | 77 | |
| 2 | 75 | 200 | 40 | 77 | 71 |
| 3 | 30 | 200 | 60 | 77 | |
| 4 | 75 | 400 | 60 | 77 | 69 |
| 5 | 50 | 300 | 50 | 77 | 71 |
| 6 | 50 | 300 | 50 | 77 | 70.5 |
| 7 | 75 | 400 | 40 | 30 | 55.5 |
| 8 | 30 | 200 | 40 | 30 | 43 |
| 9 | 75 | 200 | 60 | 30 | 58 |
| 10 | 30 | 400 | 60 | 30 | 46 |
| 11 | 50 | 300 | 50 | 30 | 50 |
| 12 | 30 | 200 | 40 | 2 | |
| 13 | 30 | 400 | 60 | 2 | 42.5 |

TABLE 1-continued

| Example | PFA thickness (microns) | Cushion Thickness (mils) | Cushion Durometer (shore A) | Underlayment Durometer (shore A) | Apparent Shore A |
|---|---|---|---|---|---|
| 14 | 50 | 300 | 50 | 2 | |
| 15 | 50 | 300 | 50 | 2 | |
| 16 | 75 | 200 | 60 | 2 | |
| 17 | 75 | 400 | 40 | 2 | |
| 18 | 30 | 200 | 40 | 2 | |
| 19 | 30 | 400 | 60 | 2 | |

Fuser Roller Testing

To compare respective performances of the fuser rollers of the Comparative Examples and Examples, these rollers were each employed with a Heidelberg Digimaster™ 9110 (HD9110) electrophotographic fusing system. In every instance unfused toner was applied to a paper substrate in the HD9110 system, with the roller being employed in the fixing of the toner to the paper.

All materials, hardware, and set points used to compare the indicated fuser rollers were consistent with the Heidelberg Digimaster™ 9110 system except for the following changes: the temperature and load of the HD9110 fuser was elevated from the standard conditions by 30 degrees Fahrenheit and 115 pounds force respectively; and the rate at which the cleaning web increments against the heater rollers was increased.

The fuser rollers of Examples 1-19 were tested for toner contamination, fusing quality, and integrity of the sleeve. Each roller was placed in the fuser, and the HD9110 system was run with standard 20# bond paper using a variety of toned images.

Toner Contamination

Fuser roller contamination rate, measured using a short run for this purpose, was 2500 prints. After the print run, toner offset to the cleaning web of the Digimaster™ 9110 system was measured to determine contamination.

As to the collection of toner on the cleaning web surface, in the Digimaster™ 9110 system the fuser roller is heated by contact with two external aluminum heater rollers that are heated by internal lamps. Toner offset from the paper was removed from the fuser roller by the heater rollers, by virtue of the high surface energy of the anodized aluminum surface of the heater rollers. A thin Nomex® cleaning web was used to remove the toner offset from the heater rollers by contact with both.

Contamination of the cleaning web was determined by measuring and averaging the optical transmission density of the toner collected on the cleaning web surface. Optical transmission density was measured using an X-Rite 310 Transmission Densitometer, from X-Rite Company.

The density of the toner offset collected by the cleaning web estimates the offset rate of the fuser. As discussed herein, the offset acts as contamination, and accordingly the offset rate indicates the degree of contamination. Therefore, the density of the offset on the web was a measure of the degree of contamination.

Clean webs were used to set the measured optical transmission density to zero. With respect to contamination, a higher web transmission density indicates an increased fuser offset rate, and thus a greater degree of contamination. Contamination leads to offset on electrostatographic apparatus parts and on images, and additionally reduces roller life.

Fusing Quality

Print samples were taken from a shorter run of maximum density images to measure fusing quality for each of the fuser rollers. Fusing quality was measured in terms of Actual Crack Width (ACW), which is the average width of removed toner as a result of folding a print so that the crease passes through a maximum density image, and removing the toner residue from the crease in a consistent manner.

Wrinkling

After testing, the condition of the rollers was observed and any visible wrinkling of the sleeve noted. Severe wrinkling may damage the roller such that the test is aborted. Note that some data is missing due to the roller failing from wrinkling before the test was completed.

The values obtained from the fusing quality and contamination tests are set forth in Table 2 below.

TABLE 2

| Example | ACW | Contamination | Winkle |
|---|---|---|---|
| 1 | 77.7 | 0.18 | N |
| 2 | 92.4 | 0.2 | N |
| 3 | 90 | 0.29 | N |
| 4 | 38.4 | 0.36 | N |
| 5 | 43 | 0.3 | N |
| 6 | 64.5 | 0.358 | N |
| 7 | 60.53 | 0.135 | Y |
| 8 | 20 | 0.0345 | Y |
| 9 | 57.44 | 0.102 | N |
| 10 | 26.36 | 0.0454 | Y |
| 11 | 41.4 | 0.105 | N |
| 12 | 60.4 | 0.15 | Y |
| 13 | . | . | Y |
| 14 | 45.9 | 0.2 | Y |
| 15 | . | 0.245 | Y |
| 16 | . | 0.146 | Y |
| 17 | 29.34 | 0.11 | Y |
| 18 | 15.8 | 0.116 | Y |
| 19 | 12 | 0.062 | Y |

The results in Table 2 show that Fusing Quality was improved as the sleeve thickness is reduced. This is easily observed by averaging the values for the rollers with the same sleeve thickness (Table 3). The results in Table 2 further show that Fusing Quality was also improved as the underlayment durometer was reduced. This is easily observed by averaging the values for rollers with the same underlayment durometer (Table 4). However, a very soft underlayment allows the sleeves to wrinkle at fusing temperatures. All of the rollers with a 2 durometer underlayment wrinkle. If the underlayment is too soft (less than about 5 shore A), the roller will generally wrinkle regardless of the cushion thickness or durometer. However, a thin sleeve was more easily wrinkled when employed on a thick cushion. Example 8 and 10 both wrinkle while Examples 9 and 11 do not. According to Table 1 for rollers with an apparent Shore A of less than about 45, the sleeves may wrinkle regardless of cushion thickness. For a cushion with an appearant hardness of 56 or greater, the sleeve will not wrinkle. However for a cushion thickness of 400 or greater, the sleeves may wrinkle if the apparent hardness is less than about 56. If the apparent hardness is 50 or greater, than the sleeve will not wrinkle if the cushion is less than about 400 mils. For an appearant hardness of about 46 or greater, the sleeve will not wrinkle if the cushion is less than about 300 mils.

Table 1 and Table 2 further demonstrate the advantage of a second cushioning layer with a high hardness on a thick softer first cushioning layer. Example 1 does not wrinkle despite the thick soft cushion, and the contamination results are very good.

TABLE 3

| Examples | PFA Sleeve Thickness (microns) | Average ACW |
|---|---|---|
| 2, 4, 7, 9, 16, 17 | 75 | 55.6 |
| 5, 6, 11, 14, 15 | 50 | 48.7 |
| 1, 3, 8, 10, 12, 13, 18, 19 | 30 | 43.2 |

TABLE 4

| Examples | Underlayment Durometer | Average ACW (microns) | Contamination |
|---|---|---|---|
| 1-6 | 77 | 67.7 | .28 |
| 7-11 | 30 | 141.1 | .08 |
| 12-19 | 2 | 32.7 | .15 |

The results in Table 4 also show that contamination was minimized at an underlayment durometer of about 30. An analysis of the data shows that the underlayment provides the largest and most significant effect on contamination. Although the contamination values reported here are not excessive, they are artificially lowered by the increased rate of the web index rate.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

The invention claimed is:

1. A fuser member comprising:

a core;

a first cushioning layer adjacent to said core;

a second cushioning layer on top of said first cushioning layer; and a plastic sleeve comprising a fluoroplastic and having a tensile hardness of from about $3*10^7$ to about $30*10^8$ pascals at 175° C.;

wherein said sleeve, first cushioning layer, and second cushioning layer have a thickness, and wherein said second cushioning layer has a thickness of at least about three times said thickness of said sleeve to no more than about equal to said thickness of said first cushioning layer;

wherein said plastic sleeve has a thickness of from about 10 to about 200 microns;

wherein the second cushioning layer has a shore A hardness of at least 5; the first and second cushioning layers have a hardness difference of about 5 shore A or greater; when the second cushioning layer has a shore A hardness of greater than a shore A hardness of said first cushioning layer, the shore A hardness of said second cushioning layer is from about 40 to about 90 and the shore A hardness of said first cushioning layer is from about 20 to about 70; and when the second cushioning layer has a shore A hardness of less than a-shore A hardness of said first cushioning layer, the shore A hardness of said second cushioning layer is from about 5 to about 70 and the shore A hardness of said first cushioning layer is from about 40 to about 90; and the fuser member has an apparent shore A hardness of at least about 45, such that said first and second cushioning layers have a hardness sufficient to allow said fuser member to make sufficient contact with a toned media surface to provide fusing properties and also limit strain on said sleeve to minimize wrinkling of said sleeve.

2. The fuser member of claim 1, wherein said core is metallic.

3. The fuser member of claim 1, wherein said first cushioning layer and said second cushioning layer are made of polymers that have a sufficient heat resistance to remain stable at fusing temperatures.

4. The fuser member of claim 1, wherein said first and second cushioning layers comprise a silicone rubber or silicone polymer.

5. The fuser member of claim 4, wherein said first and second cushioning layers comprise a cured product of vinyl and hydrosilane functional polyorganosiloxane.

6. The fuser member of claim 4, wherein said first and second cushioning layers comprise a polydimethylsiloxane composition.

7. The fuser member of claim 1, wherein said first and second cushioning layers have a thickness of from about 20 mils to about 1000 mils or more.

8. The fuser member of claim 7, wherein said first and second cushioning layers have a thickness of from about 100 mils to about 600 mils.

9. The fuser member of claim 1, wherein said first and second cushioning layers have a thickness of about 120 mils or less, when said fuser member primarily includes an internally heat fusing system.

10. The fuser member of claim 1, wherein said first and second cushioning layers have a thickness of at least about 100 mils, when said fuser member primarily includes an externally heat fusing system.

11. The fuser member of claim 1, wherein said first cushioning layer has a thickness of about 10 mils or greater.

12. The fuser member of claim 11, wherein said first cushioning layer has a thickness of from about 25 mils to about 900 mils.

13. The fuser member of claim 1, wherein said second cushioning layer has a thickness of about 10 mils or greater.

14. The fuser member of claim 13, wherein said second cushioning layer has a thickness of from about 15 mils to about 200 mils.

15. The fuser member of claim 1, wherein said fluoroplastic comprises polytetrafluoroethylene, a polymer of chlorotrifluoroethylene, a fluorinated ethylene-propylene polymer, polyvinylidene fluoride, hexafluoropropylene, a vinylidene fluoride-co-tetrafluoroethylene, vinylidene fluoride-co-hexafluoropropylene, or combinations thereof.

16. The fuser member of claim 1, wherein said plastic sleeve has a thickness of from about 25 to about 100 microns.

17. The fuser member of claim 1, further comprising an agent to lessen offset of a toner from a receiver to said fuser.

18. A process for producing the fuser member of claim 1 comprising:

applying a first cushioning layer on a core;

applying a second cushioning layer on top of said first cushioning layer; and applying a plastic sleeve.

19. The process of claim 18, wherein said first cushioning layer is formed by injection molding followed by curing.

20. The process of claim 18, wherein said first cushioning layer is cured and is heated at a sufficient temperature and for a sufficient time to reach a predetermined hardness.

21. The process of claim 20, wherein said first cushioning layer is heated at a temperature of at least about 100° C. for at least about 3 hours.

22. The process of claim 20, wherein said first cushioning layer is heated at a temperature of at least about 180° C. for at least about 4 hours.

23. The process of claim 18, wherein said second cushioning layer is formed by injecting liquid between said first cushioning layer and said plastic sleeve.

24. The process of claim 23, wherein said second cushioning layer located between said first cushioning layer and said plastic sleeve is heated at a sufficient temperature and for a sufficient time to reach a predetermined hardness.

25. The process of claim 24, further comprising a post-curing process, wherein said post-curing process involves heating said first and second cushioning layers at a sufficient temperature for a sufficient time to prevent shrinking of said first and second cushioning layers.

26. The process of claim 25, wherein said post-curing process includes heating said first and second cushioning layers to a temperature of from about 150° C. to about 260° C. for from about 3 hours to about 48 hours.

27. The process of claim 18, wherein said plastic sleeve comprises a sintered fluoropolymer resin powder.

28. The process of claim 27, wherein said fluoropolymer resin powder comprises semicrystalline fluoropolymer or a semicrystalline fluoropolymer composite.

29. The process of claim 27, wherein said fluoropolymer resin powder comprises PTFE powder, polyperfluoroalkoxy powder, FEP powder, PFA powder, poly(ethylenetetrafluoroethylene) powder, polyvinylfluoride powder, polyvinylidene fluoride powder, poly(ethylene-chloro-trifluoroethylene) powder, polychlorotrifluoroethylene powder, a copolymer thereof or mixtures thereof.

30. The fuser member of claim 1, wherein said fluoroplastic is a polyperfluoroalkoxy.

31. The fuser member of claim 1, wherein said fuser member is a fuser roller.

32. The fuser member of claim 1, wherein said fuser member is a fuser belt.

33. The fuser member of claim 1, wherein said fuser member is a fuser plate.

* * * * *